2,980,965
Patented Apr. 25, 1961

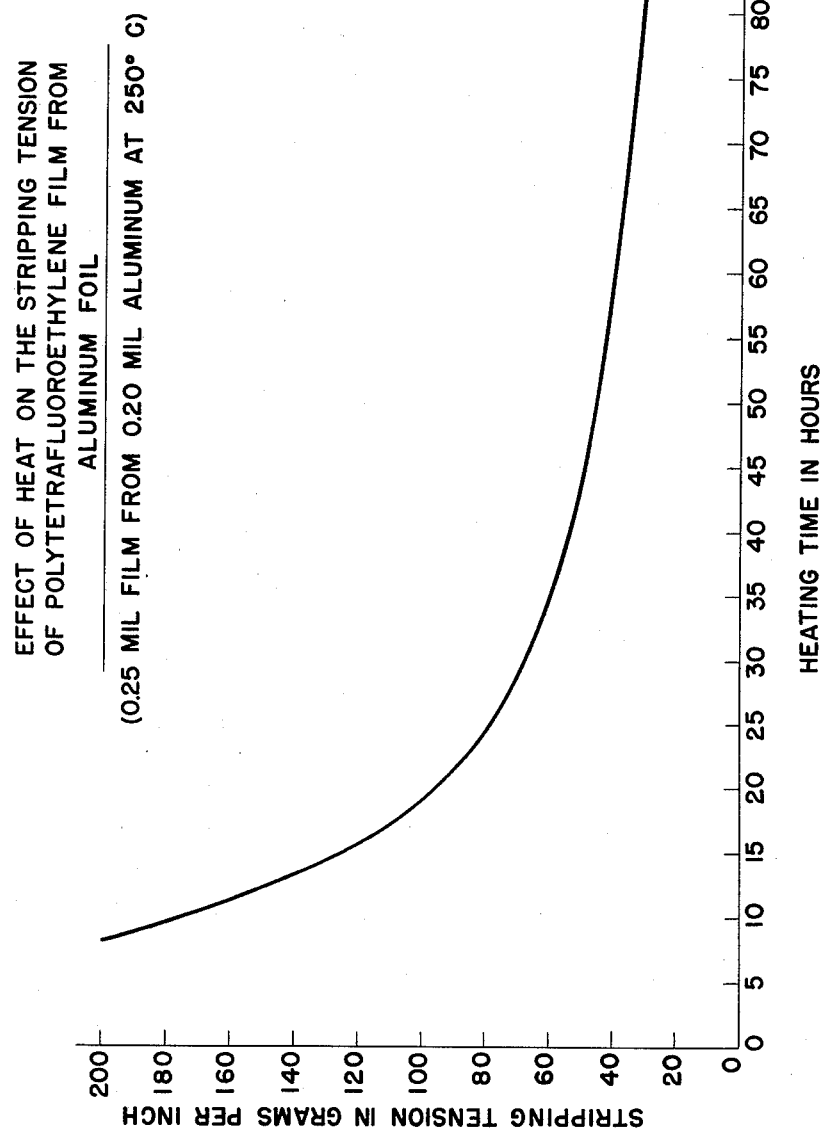

2,980,965
METHOD OF MAKING PLASTIC FILM

Joseph R. Infantino, Chappaqua, N.Y., and Donald A. Savitz, Stamford, Conn.; said Infantino assignor to American Machine & Foundry Company, a corporation of New Jersey Filed Feb. 28, 1958, Ser. No. 718,220

5 Claims. (Cl. 18—57)

This invention relates to the manufacture of polytetrafluoroethylene film. More particularly, this invention concerns a dry method of separating a polytetrafluoroethylene (perfluoroethylene) coating from aluminum.

Thin films of polytetrafluoroethylene produced by coating aqueous resin dispersions on copper or iron, sintering and peeling have been described in U.S. Patent No. 2,540,962 of Puppolo. In this process stripping the plastic from the metal surface breaks a layer of metal oxide and risks rupture, splitting or tearing of the plastic film.

These metals form relatively loosely adhering oxides compared with aluminum and some oxide particles tend to cling to the plastic. When the plastic film is used for electrical applications, an acid treatment is needed to free the film from metal oxide, and this is an undesirable wet process. When film less than one mil thick is treated with liquid, it becomes difficult to handle, as wrinkling and folding become major problems which are not present in handling dry film. Correspondingly, a process of dissolving the metal casting surface with acid or alkali, as described in U.S. Patent No. 2,520,173 develops wet handling and wrinkling problems. In both methods acid residue on the film can result in corrosion of electrical components in which the film is used.

Accordingly, it is an object of this invention to provide a method of making very thin electrical grade polytetrafluoroethylene film by a dry stripping method.

It is also an object of the invention to provide a method of separating a polytetrafluoroethlene coating from a metal base such as aluminum on which an intermediate oxide coating adheres tightly to the metal and does not contaminate the polytetrafluoroethylene film.

The advantages of the invention are realized by heating aluminum coated with a thin film of polytetrafluoroethylene (one-tenth mil to three mils thick). Aluminum forms an oxide which unlike iron and copper, adheres very tightly to the metal. The dry polytetrafluoroethylene film can be peeled smoothly and evenly without adhering oxide particles. The presence of oxide may help in the release of the film.

Heating the coated metal is a preferred method of loosening the plastic film which adheres too tightly to be stripped without heating. Temperatures between 95° C. and 450° C. are used, but heating time is adjusted to avoid chemical degradation of the polymer structure. While heat can conveniently be applied in the 95° C. to 150° C. range by hot water, steam and hot air, the invention also included prolonged baking in air for periods as long as twenty days at temperatures low enough to avoid plastic degradation. No further treatment is required prior to stripping, such as wet acid etching to remove oxide scale from the film. Dry separation of the film from the oxidized metal base is easily accomplished.

In the drawing, a graph illustrates the loosening of the bond between film and metal as heating of a composite structure is prolonged at 250° C. for many hours.

A polytetrafluoroethylene coated metal base was prepared by the following method: oil free, soft temper aluminum foil was coated on both sides with an aqueous dispersion of polytetrafluoroethylene. Any size foil which is easy to handle will work well according to this invention. The foil was about 0.2 mil thick.

The foil was dip-coated at room temperature and at constant speed in a bath of polytetrafluoroethylene particles suspended in water containing a non-ionic, alkyl aryl alcohol type wetting agent such as "Triton X-100," a trademarked product of the Du Pont Company. The polytetrafluoroethylene particles had an average diameter of about 0.3 micron.

The thickness of the polymer coating on the foil varies with changes in the viscosity of the coating bath. Water is added to the bath to control viscosity as evaporation loss occurs during dipping. A preferred coating composition comprises a 42% by weight dispersion of polytetrafluoroethylene in water containing about 6%, by weight based on polytetrafluoroethylene, of the wetting agent. A quarter mil coating was applied to the aluminum foil by immersing the foil in this bath at about three feet per minute. The coating of dispersion on the foil was sintered to form a film.

In contrast to copper or iron at this point the film adheres very tightly to aluminum and cannot be stripped from the metal without damaging the film. Further, treatment according to the invention results in substantial loosening of the film from the metal as shown in the drawing and the following examples:

Example one

The polytetrafluoroethylene film coated foil was wound on a reel and baked in air for ninety hours at about 250° C. This method is particularly valuable when long metal strips can be removed from a continuous production system and separately baked in rolled-up form. The drawing shows the weakening of the bond between film and foil. The plastic was easily peeled off dry in air and wound on a core.

Longer exposure to heat tends to produce a weaker bond between the plastic film and the metal base, as shown in the drawing. When care is taken to avoid resin degradation, oven temperatures may range as high as 450° C. The higher temperatures allow correspondingly shorter baking times. At 250° C. only about ninety hours were needed to treat 0.2 mil foil coated with a quarter mil film. When a long plastic coated metal foil is rolled upon a core rather than heated in open unlayered condition, higher temperatures and/or longer exposure times are preferred.

Example two

Aluminum foil was coated with polytetrafluoroethylene film and immersed fifteen minutes in boiling water and dried. The film was peeled apart from the foil while dry. A five minute exposure to low pressure steam gave similar results.

There has thus been described a method of separating aluminum from a coating of polytetrafluoroethylene by heating and subsequent dry peeling off of the plastic. By using metals such as copper and iron there is a danger of contamination of film by metal oxide. When aluminum is used, a special heating loosens tightly adhering film from the metal without contamination.

What is claimed is:

1. A method of making polytetrafluoroethylene film comprising in combination the steps of coating an aluminum surface with a suspension of polytetrafluoroethylene particles in a liquid, evaporating said liquid and sintering said particles into a film and thereafter heating said aluminum surface at a temperature between 95° C. and 450° C. until film adhesion is reduced and peeling said film from said aluminum surface.

2. A dry method of separating an aluminum base from a sintered polytetrafluoroethylene coating which comprises in combination the steps of baking coated aluminum at a temperature between 95° and 450° C. until film can be stripped without damage and peeling the coating from the aluminum.

3. A method of separating an aluminum base from a sintered polytetrafluoroethylene coating which comprises in combination the steps of immersing the coated base in water at a temperature in excess of 95° C. and peeling away the coating.

4. A method of separating an aluminum base from a sintered polytetrafluoroethylene coating which comprises in combination the steps of exposing the coated base to steam until the film can be stripped without damage and peeling away the coating.

5. A method of making polytetrafluoroethylene film comprising in combination the steps of coating an aluminum surface with a dispersion of polytetrafluoroethylene in a liquid, drying and sintering said dispersion to form a film and thereafter heating said film coated aluminum surface to reduce film adhesion to said aluminum surface and peeling said film from said surface.

References Cited in the file of this patent

UNITED STATES PATENTS

| | | |
|---|---|---|
| 2,485,691 | Bogese | Oct. 25, 1949 |
| 2,540,962 | Puppolo | Feb. 6, 1951 |
| 2,578,522 | Edgar | Dec. 11, 1951 |
| 2,710,266 | Hochberg | June 7, 1955 |
| 2,751,315 | Staehle | June 19, 1956 |
| 2,774,109 | Kaufman | Dec. 18, 1956 |

FOREIGN PATENTS

| | | |
|---|---|---|
| 547,222 | Canada | Oct. 8, 1957 |

OTHER REFERENCES

Fetter: "Line Tanks With Teflon," from Chemical Engineering, November, 1949, pp. 120–124.